(12) United States Patent
Descamps et al.

(10) Patent No.: US 8,603,419 B2
(45) Date of Patent: Dec. 10, 2013

(54) METHOD OF TREATING AN ALKALINE GRANULAR CARBONATABLE MATERIAL

(75) Inventors: Philippe Descamps, Ham-sur-Heure (BE); Isabelle Lecomte, Vinalmont (BE); Evelyne Nguyen, Grez-Doiceau (BE); Dirk Van Mechelen, Tisselt (BE)

(73) Assignee: Recoval Belgium, Farcienes (BE)

( * ) Notice: Subject to any disclaimer, the term of this patent is extended or adjusted under 35 U.S.C. 154(b) by 0 days.

(21) Appl. No.: 13/391,521

(22) PCT Filed: Aug. 23, 2010

(86) PCT No.: PCT/EP2010/062276
§ 371 (c)(1),
(2), (4) Date: Apr. 18, 2012

(87) PCT Pub. No.: WO2011/020927
PCT Pub. Date: Feb. 24, 2011

(65) Prior Publication Data
US 2012/0195814 A1  Aug. 2, 2012

(30) Foreign Application Priority Data

Aug. 21, 2009  (BE) .................................. 2009/0514

(51) Int. Cl.
*C04B 18/00* (2006.01)
(52) U.S. Cl.
USPC ............ 423/111; 423/629; 106/705; 106/405
(58) Field of Classification Search
USPC .......... 106/403–405, 705–710; 423/625, 629, 423/111; 23/313 R
See application file for complete search history.

(56) References Cited

FOREIGN PATENT DOCUMENTS

| FR | 2 755 884 | 5/1998 |
| WO | 2007096671 | 8/2007 |
| WO | 2008/142607 | * 11/2008 |
| WO | 2009/138823 | * 11/2009 |

OTHER PUBLICATIONS

International Search Report and Written Opinion of PCT/EP2010/062276, Applicant Recoval Belgium, dated Jul. 5, 2011, (10 pgs.).
L. Bertolini, M. Carsanaa, D. Cassagoa, A. Quadrio Curziob and Mario Collepardia: "MSWI Ashes as Mineral Additions in Concrete", Cement and Concrete Research, vol. 34, No. 10, Oct. 2004, pp. 1899-1906 (8 pgs).
J. M. Chimenos, A. I. Fernandez, L. Miralles, J. R. Rosell, A. Navarro Ezquerra: "Change of Mechanical Properties during Short-Term Natural Weathering of MSWI Bottom Ash", Environmental Science & Technology, vol. 39, No. 19, 2005, pp. 7725-7730 (6 pgs.).

\* cited by examiner

*Primary Examiner* — Steven Bos
(74) *Attorney, Agent, or Firm* — McCracken & Frank LLC

(57) ABSTRACT

The invention concerns a method of treating an alkaline granular carbonatable material which contains aluminium metal and which has in particular a pH of at least 10. The method comprises an oxidation step wherein at least a portion of said aluminium metal is oxidized by contact with moisture. The aluminium should be oxidized to avoid swelling problems when using the granular material as aggregate. In the method according to the invention this oxidation is accelerated by providing at least one oxidizing agent in said moisture, which oxidizing agent has a higher redox potential than the water contained in said moisture. The method further comprises a carbonation step wherein the granular carbonatable material is at least partially carbonated to lower the pH thereof. In this way the formation of ettringite, which may also release aluminium ions which causing further swelling problems, can be avoided in the granular material or any ettringite present therein can be destabilized.

27 Claims, 2 Drawing Sheets

METHOD OF TREATING AN ALKALINE GRANULAR CARBONATABLE MATERIAL

The present invention relates to a method of treating a granular carbonatable material which contains aluminium metal and which has in particular a pH of at least 10. In this treatment method at least a portion of the aluminium metal is oxidised by contact with moisture.

In order to limit the impact, both economic and environmental, of domestic and industrial waste materials, attempts have been made more and more to develop methods of processing these materials, i.e. methods for converting these waste materials into economically exploitable materials. A large quantity of waste materials is alkaline and comprises carbonatable substances, such as calcium and/or magnesium oxides and/or hydroxides. It is known that the carbonation of these substances, in particular calcium hydroxide, makes it possible to obtain materials having good mechanical qualities, as well as a better retention of pollutants, in particular heavy metals, present in such waste and posing significant problems for the elimination thereof.

It has for example been proposed, in international patent application WO 2007/096671 A1, to proceed with an accelerated carbonation of waste in a rotary drum in order to produce a secondary granulate that can serve as a construction material. A similar process has been proposed for waste from the extraction or processing of metals in international patent application WO 2009/024826 A1. In the materials obtained by these processes, the carbonation of lime, present in the waste, forms a calcic matrix ensuring both less leaching of the heavy metals contained in the waste, and greater mechanical strength.

However, some waste, such as for example municipal waste incinerator bottom ashes (MWI-bottom ashes), comprises a substantial proportion of aluminium metal. Municipal waste incinerator bottom ash consists principally of non-combustible coarse material and unburnt organic matter collected in a cooling basin at the discharge from a combustion chamber of an incinerator. They are composed of solid phases formed at high temperature, some of which are maintained in a metastable state following the rapid cooling of the materials emerging from the combustion chamber. To reprocess the bottom ash, it is generally subjected to a separation of the aluminium metal by eddy currents, followed by natural aging (weathering) of several months. During this aging, a complex series of several interconnected chemical phenomena takes place. These phenomena include hydrolysis, hydration, dissolution/precipitation, carbonation, the formation of solid solutions and oxidation/reduction. The aging of the bottom ash is particularly required to reduce the problems of swelling that may occur when bottom ash is used in construction, in particular as a road foundation (lean concrete) or even as a granulate in concrete. The bottom ash comprises aluminium, a significant proportion of which is in its elementary form, i.e. in the form of aluminium metal. Because of the high pH of the bottom ash, and the relatively low redox potential of aluminium, aluminium metal is oxidised and reacts with hydroxyl ions during the aging process to form aluminates which are further precipitated into expansive $Al(OH)_3$. Consequently, $Al(OH)_3$ formation in the bottom ash during aging is important to avoid problems of swelling when the bottom ash is used as an aggregate. This is because, when the aluminium is not previously corroded or even better passivated with a coating covering it, the subsequent hydroxylation thereof will produce swelling. Moreover, when used as aggregate in concrete the oxidation reaction of the aluminium metal as a result of the high pH of fresh and especially of setting concrete will produce hydrogen gas forming gas bubbles in the concrete and reducing thus the strength thereof. As described in "Aggregate cement reactions in MWI-bottom ash-based concrete—a petrographical assessment", B. Laenen, R. Dreesen and D. Van Rossem, International Conference on Sustainable Concrete Construction; 20020909-11; Dundee (GB), the swelling reaction caused by aluminium particles in bottom ash used as an aggregate in concrete may thus be reduced by prior natural aging (weathering). The main disadvantage of such bottom ash aging is however that it takes a great deal of time and requires a large amount of storage space.

During the natural aging of the bottom ash, it swells so that subsequent problems of swelling can be avoided. This swelling is caused by the formation of an aluminium hydroxide gel. The origin of this aluminium may be twofold. It may result from:
  residual aluminium metal (packaging) that dissolves in the alkaline leachate (pH≈11 to 12), thereby producing hydrogen gas, before precipitating, in the form of hydroxide, during the relative acidification of the environment (pH≈9 to 10) following carbonation of portlandite $[Ca(OH)_2]$;
  the decomposition of ettringite, a hydrated calcium sulphoaluminate of chemical formula $[Ca_6Al_2(SO_4)_3(OH)_{12}.26H_2O]$ that is produced in an alkaline environment as a result of the presence of sulphate and aluminium ions which are present in residual form in the MWI-bottom ashes.

The progressive carbonation of the portlandite $[Ca(OH)_2]$ in the bottom ash causes a drop in the pH and a precipitation of calcite in accordance with the following reaction:

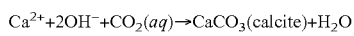
$$Ca^{2+}+2OH^-+CO_2(aq)\rightarrow CaCO_3(calcite)+H_2O$$

Although the bottom ash is initially highly alkaline (pH≈11 to 12), the carbonation thereof, in particular the carbonation of portlandite, will therefore lower the pH. This acidification following the progressive carbonation of the portlandite will cause a precipitation of the dissolved aluminium forming an aluminium hydroxide gel $[Al(OH)_3]$ causing a swelling of the material.

At the same time, precipitation of calcite creates a demand for $Ca^{2+}$ ions shifting the chemical balances in a way that, conjointly with the drop of the pH, will also contribute to destabilising the ettringite: $Ca_6Al_2(SO_4)_3(OH)_{12}.26H_2O$ (ettringite)$+12H^+\rightarrow 2Al^{3+}+3SO_4^{2-}+6Ca^{2+}+38H_2O$

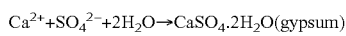
$$Ca^{2+}+SO_4^{2-}+2H_2O\rightarrow CaSO_4.2H_2O(gypsum)$$

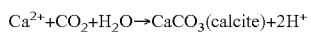
$$Ca^{2+}+CO_2+H_2O\rightarrow CaCO_3(calcite)+2H^+$$

This ettringite destabilisation will therefore cause the formation of gypsum, and the additional release of $Al^{3+}$ ions that may once again lead to the formation of aluminium hydroxide with a swelling character.

These chemical reactions clearly illustrate that the swelling phases, whether it is a case of ettringite or aluminium hydroxide, are dependent on the presence of aluminium in the starting material. In addition, these phases contribute to the changing character of the bottom ash mainly on the mineralogical level and therefore questions may be posed with regard to their long-term stability. Thus, by way of example, ettringite, which has a certain capacity to trap lead, will be caused to remobilise this element when it decomposes (occurring following the reduction in the pH associated with the carbonation of the portlandite).

For this reason, the objective of the natural aging of bottom ashes is not only a progressive carbonation of the portlandite but also and in particular a dimensional and mineralogical stabilisation of the bottom ash.

It has also been proposed to treat alkaline waste materials such as MWI bottom ash by accelerated carbonation, for example in the articles "Carbon dioxide sequestration in municipal solid waste incinerator (MSWI) bottom ash", Eva Rendek, Gaëlle Ducom and Patrick Germain, Journal of Hazardous Materials, B128 (2006) 73-79 (doi: 10.1016/j.jhazmat.2005.07.033), "Accelerated Carbonation for treatment of MSWI bottom ash", S. Aickx, T. Van Gerven and C. Vandecasteele, Journal of Hazardous Materials, Vol. 137, No. 1, September 2006, pp. 235-243 (doi: 10.1016/j.jhazmat.2006.01.059), "Artificial carbonation for controlling the mobility of critical elements in bottom ash", Jelena Todorovic, Malin Svensson, Inga Herrmann and Holger Ecke, Journal of Material Cycles and Waste Management, Vol. 8, No. 2, September 2006, pp. 145-153(9) (doi: 10.1007/s10163-006-0153-x), "Bottom Ash from Municipal Solid Waste Incineration (MSWI) in Road Construction", Holger Ecke, Katarina Kylefors, Christian Maurice and Anders Lagerkvist, International Conference on Beneficial Use of Recycled Materials in Transportation Applications, November 2001, "Evaluation of pre-treatment methods for landfill disposal of residues from municipal solid waste incineration", Kim Sang-Yul, Toshihiko Matsuto and Nobutoshi Tanaka, Waste Management and Research, 21(5), 2003, 416-423, "The Leaching Behavior of Heavy Metals in MSWI Bottom Ash by Carbonation Reaction with Different Water Content", Um Nam-II, You Kwang-Suk, Han Gi-Chun, Lee Im-Chang, Cho Kye-Hong, Ahn Ji-Whan, and Cho Hee-Chan, The Minerals, Metals and Materials Society, and "Production of lightweight aggregate from industrial waste and carbon dioxide", Peter J. Gunning, Colin D. Hills and Paula J. Carey, Waste Management, electronic publication of 3 Jul. 2009. However, the present inventors have discovered that the accelerated carbonation of waste still containing substantial proportions of aluminium with a view to producing a material complying with the required standards in construction comes up against significant obstacles, in particular with regard to the long-term stability of the carbonated material.

This is because such materials generally exhibit phenomena of swelling, which, for the application sought, prove to be deleterious in particular on a mechanical level, which has moreover led to fixing, in the RW 99 specification of the Walloon Region relating to the use of bottom ash in road technology, a swelling threshold value that may not be exceeded (2% after 28 days of accelerated aging at a temperature of approximately 50° C. according to the CME-RW99-01.12.0 test method).

One drawback of accelerated carbonation is therefore that, unlike prolonged natural aging, an accelerated carbonation does not result in the same dimensional and mineralogical stabilisation and is not in a position to solve the problems of swelling of carbonated materials, in particular carbonated bottom ash.

When bottom ashes, whether they are carbonated or not, are used as aggregate in concrete, the aluminium metal present therein reacts with the alkaline water contained in the fresh and especially in the setting concrete to produce hydrogen gas. The problem of this hydrogen gas production is described in the publication "MSWI ashes as mineral additions in concrete", L. Bertolini, M. Carsanaa, D. Cassagoa, A. Quadrio Curziob and M. Collepardia, Cement and Concrete Research, Vol. 34, No. 10, October 2004, pp. 1899-1906. The authors have found that the hydrogen production could be avoided by wet grinding the bottom ashes to an average particle size of about 3 μm, and by allowing the slurry (having a solid/liquid ratio of 1:1) to rest for a few days. In this way, the aluminium metal was oxidised to such an extent by the alkaline slurry water that no expansion was observed in concrete wherein 30% of the cement was replaced by the wet ground MSWI bottom ash. As a result of the high pH of the slurry, reaching a value of about 11.5, corrosion of the aluminium was promoted thus producing hydrogen bubbles in the slurry instead of in the concrete. This effect was not observed in dry ground bottom ash, the use of which as cement replacement led to a considerable reduction of the strength of the concrete as a result of the production of hydrogen bubbles in the concrete. Aluminium corrosion tests are described in this article which demonstrate that at a pH of 11.5 a metal aluminium plate corrodes at a rate of about 1 $mg/m^2/day$ whereas at a pH of about 12.5 it corrodes at a rate which was about 100 times greater and at a pH of 13-13.5 at a rate which was even about 1000 times greater. Notwithstanding the fact that the bottom ashes were ground very finely (average particle size of about 3 μm) so that the aluminium metal had a large available surface, the bottom ashes required a couple of days to a couple of months of rest to end the gas development. The authors thus suggested investigating some factors which might influence the time for the exhaustion of the hydrogen evolution reaction, such as the fineness of the MSWI bottom ash particles, the temperature, the stirring conditions and a higher pH.

The use of a higher pH to reduce the aluminium metal content of the bottom ash is already described in the poster "Use of municipal solid waste incinerator bottom ash as aggregate in concrete" by K. Rübner, F. Haamkens and O. Linde, published on the website www.bam.de. The initial aluminium metal contents of coarser MSWI bottom ash aggregates of 1.22 wt. % (⅔ mm fraction), 1.59 wt. % (⁹⁄₁₆ mm fraction) and 1.06 wt. % (¹⁶⁄₃₂ mm fraction) could be reduced with a lye treatment with an NaOH solution to less than 0.4 wt. % thus avoiding damage to the concrete produced with these aggregates. A drawback of this method is that a relatively large amount of NaOH is required to raise the pH to increase the corrosion rate of the aluminium metal but that even at that high pH it takes quite a lot of time to oxidise a major part of the aluminium in view of the large particle size (and thus the relatively small surface area). Moreover, at this high pH the ettringite remains in the bottom ash and can thus still cause swelling phenomena when the pH of the bottom ashes drops, which will be especially the case when the bottom ashes are used as construction aggregates in layers which are not bonded by means of cement so that their pH may drop more quickly. A further drawback is that under the very alkaline conditions of the alkaline granular material, the glass cullet contained therein (in particular in bottom ashes) will promote the alkali silicate reaction associated with the formation of an expansive silica gel.

FIG. 1 shows a titration graph obtained by titrating a slurry composed of 100 grams of crushed bottom ashes mixed with 100 ml of distilled water with a 1M sodium hydroxide solution (pH 14). It can be seen that the pH of the slurry is considerably lower than the pH which can be calculated based on the dilution of the 1M NaOH solution in the distilled water (the dilution of 100 ml 1 M NaOH solution in 100 ml of distilled water would result for example in a concentration of 0.5 M, or a pH of about 13.7, instead of the observed pH of about 12.8) so that it takes quite a lot of NaOH to increase the pH of the bottom ashes to such an extent that a high aluminium oxidation speed is achieved. In fact, the test results indicated in FIG. 1 show that the bottom ash contains substances which are acidic with respect to hydroxide at those high pH values providing a "buffering" effect so that reaction of these substances with hydroxide requires extra sodium hydroxide. FIG. 2 is a same titration graph as FIG. 1, but the titration has been done with 10M NaOH (about 400 g NaOH/l) instead of with 1M NaOH. With such a higher NaOH concentration, a higher pH can be achieved, but again it appears that the pH increase is smaller than the theoretical increase calculated based on the dilution effect (the dilution of 10 ml of the 10 M NaOH solution to 100 ml of water giving a hydroxide concentration of about 0.9 M would result in a pH of about 14 instead of the measured value of 13.3). From the article of Bertolini et al. it appears that at a pH value of about 13.3 the aluminium oxidation rates (expressed in mg/m$^2$/day) would be about 1000 times greater than at the pH value of 11.5. However, in aggregates with particles which are at least 1000 times larger than the finely milled particles described by Bertolini (average particle size of about 3 μm), the aluminium metal particles/inclusions will also be much bigger and will thus provide a considerably smaller surface area so that the time needed to corrode the aluminium will also be in the same order of magnitude, more particularly in the order of magnitude of days or even months. In fact, supposing a cylindrical shape of the aluminium particles/inclusions, when these particles/inclusions are 1000 times larger, their surface area, and hence their oxidation speed, will be 1000 times smaller.

The method described in the present disclosure addresses the above described problems by proceeding not only with an oxidation step wherein aluminium metal is oxidised but also with a carbonation step wherein the alkaline granular carbonatable material is at least partially carbonated by means of carbon dioxide, the oxidation step being accelerated by providing at least one oxidising agent, which has a higher redox potential than the water contained in the moisture which is in contact with the aluminium metal, in this moisture.

By "moisture" is to be understood the liquid contained in the pores of the granular material and/or adhered to the granular material and, when the granular material is combined with more liquid than the liquid contained therein or adhered thereto, also the liquid wherein the granular material is embedded (in particular as a slurry or a dispersion).

Due to the fact that the oxidising agent has a higher redox potential than the water contained in the moisture which is in contact with the aluminium metal (under the actual oxidation conditions), which moisture will be alkaline due to the alkaline nature of the granular material, no hydrogen gas will be liberated by the reaction of water (reduction) with aluminium metal in accordance with the following oxido-reduction reaction:

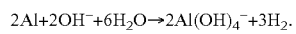

Instead, when using for example a salt of permanganate as oxidising agent, the following reaction will take place:

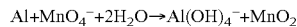

An important advantage of the use of an oxidising agent is that the pH of the moisture contained in the granular material does not have to be raised in order to increase the oxidation rate. Compared to the amount of NaOH, less moles of the oxidising agent are thus needed. Moreover, since ettringite is formed under alkaline conditions, no or less ettringite will be formed in the carbonatable material during the oxidation step. The carbonation step is further intended to lower the pH of the granular material so that the formation of ettringite is avoided or so that any ettringite contained in the granular material is destabilised. Since under normal temperature and pressure conditions only a few percentages of calcium carbonate can be formed during the carbonation step, it is not possible, or at least much more difficult, to achieve the required low pH value by the carbonation step after having raised the pH to the high values required to oxidise the aluminium with release of hydrogen gas. The pH could be lowered by means of an acid, resulting however in additional costs and the formation of salts which may have disadvantageous effects in the carbonated material. In contrast to the use of NaOH, the addition of an oxidising agent, usually results in a lowering of the pH, thus requiring less carbonation to avoid the formation of ettringite or to destabilise any ettringite present in the granular material.

Depending on the pH, the accelerated oxidation of the aluminium metal transforms at least part of the aluminium metal into aluminium oxide and/or creates layers of aluminium oxide and/or hydroxide around metal aluminium particles. Not only do these layers become substantially inert but they also protect the cores of the particles, which remain in the metal state, limiting the release of $Al^{3+}$ ions, and therefore the subsequent formation of aluminium hydroxide.

In a preferred embodiment of the method according to the invention, alkaline granular carbonatable material is carbonated until it has a pH lower than 10, preferably lower than 9.5 and more preferably lower than 9.

At a pH lower than 10, ettringite is not formed and is not stable so that the carbonated material doesn't contain any ettringite. As explained hereabove, when the granular material contains ettringite, usually as a neoformed phase formed in an alkaline environment in the presence of sulphate and aluminium ions, this ettringite will release aluminium ions when the pH of the granular material drops below 10, which aluminium ions may subsequently form an aluminium hydroxide gel causing an undesirable swelling of the material.

Accelerated oxidation may be effected before, after and/or simultaneously with accelerated carbonation.

The accelerated oxidation is however preferably performed after (or during) the accelerated carbonation so that the pH of the granular material has already been lowered and so that consequently the passivation of the aluminium metal may be more effective because of the lowering of the pH obtained during the carbonation. This is because, at a pH below 8.5-9, aluminium metal is passivated rather than oxidised whilst above this pH value aluminium metal will rather corrode without forming a passivating coating. In fact, under these more alkaline conditions, the oxidised aluminium will be in the form of more water-soluble $Al(OH)_4^-$ ions whilst at lower pH values aluminium metal is oxidised immediately in the substantially water-insoluble $Al(OH)_3$ form forming a passivation layer. Consequently, under more alkaline conditions (i.e. oxidation before carbonation), there will therefore be a tendency to promote an attack deeper into the grains, with consequently a more complete oxidation of the aluminium metal. When promoting aluminium passivation, i.e. when lowering the pH of the granular material to a pH lower than 9 at least partially before the oxidation step, considerably less oxidising agent will thus be required since the produced passivation layer has only a very small thickness.

Advantageously, said oxidising agent is chosen from the group comprising hypochlorites, peroxides, permanganates, perchlorates and perborates, as well as combinations of same, so as to accelerate the oxidation rate compared with oxidation by natural aging. Even more advantageously, said oxidising agents could be dissolved in an aqueous medium which is applied onto the alkaline granular material. This aqueous medium, applied to the granular material, can thus assist in obtaining the optimum moisture content for its subsequent accelerated carbonation. The aqueous medium is preferably sprayed onto the granular material. In the prior art, wherein NaOH is used to oxidise the aluminium metal, such a spray process is not possible in view of the too high concentration of NaOH required to raise the pH (too viscous and too aggressive liquid).

Advantageously, the moisture content of the granular material is less than 90% by dry weight, preferably less than 70% by dry weight and more preferably less than 50% by dry weight during the accelerated oxidation. These low moisture contents accelerate the carbonation step and are easily obtained in the process according to the invention since only a small amount of the (dissolved) oxidising agent needs to be applied (in particular sprayed) onto the granular material.

Advantageously, said carbonation may be performed in a rotary drum. Such a rotary drum facilitates diffusion of the carbonation agent in the carbonatable material. In this way, the granular material may contain more water, and may in particular even be saturated with moisture.

Advantageously, said carbonation may be performed with carbon dioxide, preferably with gaseous carbon dioxide, and more particularly in an atmosphere enriched with gaseous carbon dioxide. Such an atmosphere could contain for example combustion gases or gases resulting from industrial processes producing carbon dioxide.

Thus this process could serve to substantially reduce the greenhouse gas emissions and provides a cheap method for lowering the pH of the granular material in view of destabilising ettringite and/or preventing the formation thereof (by lowering the pH of the fresh material, in particular the fresh bottom ash, before secondary ettringite will be formed therein under the alkaline conditions of the fresh material).

Advantageously, the carbonation is accelerated by treating the alkaline granular carbonatable material with a medium containing more than 1 wt. %, preferably more than 5 wt. % and more preferably more than 10 wt. % of carbon dioxide, which medium is preferably a gas.

Advantageously, said carbonatable material could contain at least one waste material, which would thus be reprocessed as raw material while encapsulating any contaminants, such as heavy metals, contained therein. The waste material could itself be carbonatable, but a carbonatable binder, such as cement, could also be added thereto.

Even more advantageously, said waste material could contain at least bottom ash, for example municipal waste incinerator bottom ash. Such bottom ash normally contains both carbonatable components, including in particular portlandite, and aluminium metal and ettringite, as well as heavy metals. The method disclosed here would thus make it possible to obtain a material that could be used in construction and is stable (even when the pH is lowered to a pH value of less than 10) and in which the heavy metals would be immobilised.

Advantageously, the processing method could also comprise a prior step of separating some of the aluminium metal by eddy currents. In this way, the aluminium metal content and therefore also the associated swelling phases could be reduced in this prior step. In addition, the method would thus enable the economical recovery of part of the aluminium metal, a material with a high commercial value and the production of which requires very significant contributions of energy and is a significant source of greenhouse gas emissions.

Advantageously, the granular carbonatable material still comprises at the start of said oxidation step at least 0.1% by dry weight, in particular at least 0.3% by dry weight and more particularly at least 0.5% by dry weight of aluminium metal.

Advantageously, at the start of said accelerated carbonation, the carbonatable material could have a moisture content of between 10% and 15% by weight. A moisture content in this range, and in particular around 12%, facilitates the carbonation of the carbonatable material by the diffusion of carbon dioxide in the water.

Advantageously, said carbonatable material could be in the granular state.

Such a granular state facilitates both the physical handling of this material and the chemical processing thereof by accelerated oxidation and carbonation.

More advantageously, said granular carbonatable material may contain particles with a size greater than 1 mm, preferable greater than 2 mm, and even more preferably greater than 4 mm, and this at least during the carbonation and the oxidation step. Alternatively, the processing method could also comprise a pelletisation step wherein grains of said carbonatable material would be agglomerated so as to obtain a coarser granular material. In this way, it becomes possible to adjust the granulometry of the material resulting from the processing of granular material with a very fine granulometry to its subsequent application as an aggregate.

Preferably, said pelletisation step could be prior to the accelerated carbonation. In this way, the grains agglomerated in the pelletisation step could be bonded to one another by the carbonates formed during the accelerated carbonation. However, the pelletisation could also be simultaneous with the carbonation, so that the agglomerated grains are bonded by successive layers of carbonates.

The present disclosure also concerns a method which comprises the further step of using the carbonated and oxidised granular material as a construction aggregate to produce a layer which is not bonded by means of cement, or more generally by means of a hydraulic binding agent. The layer may in particular be a sub-base layer, in particular a sub-base layer of a road construction.

Details concerning the invention are described below with reference to the drawings.

Figure 1:
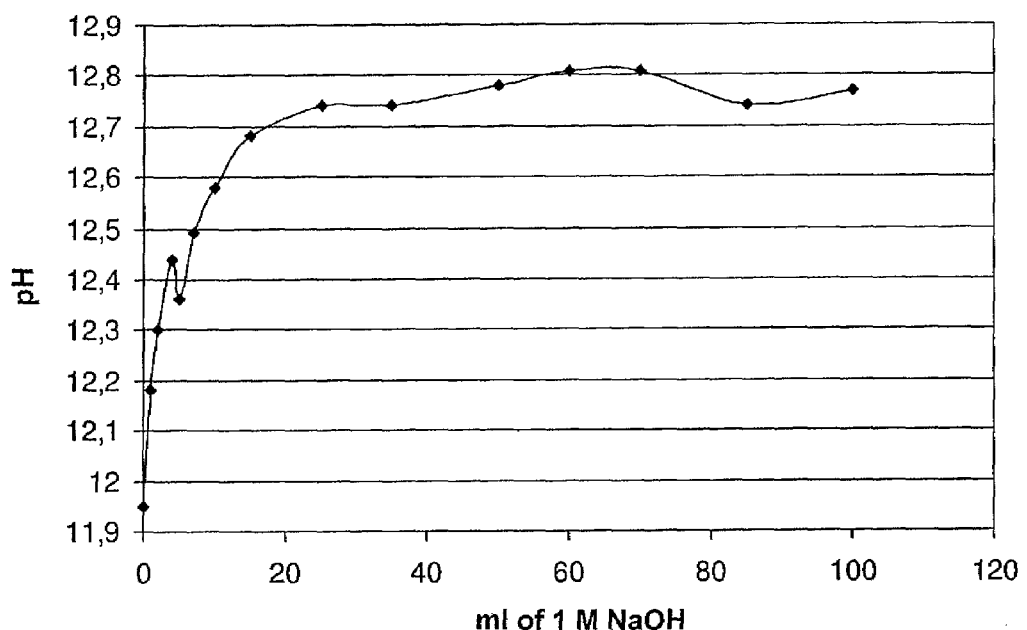
FIG. 1 shows a titration graph of bottom ashes titrated with a 1 M NaOH solution.
Figure 2:
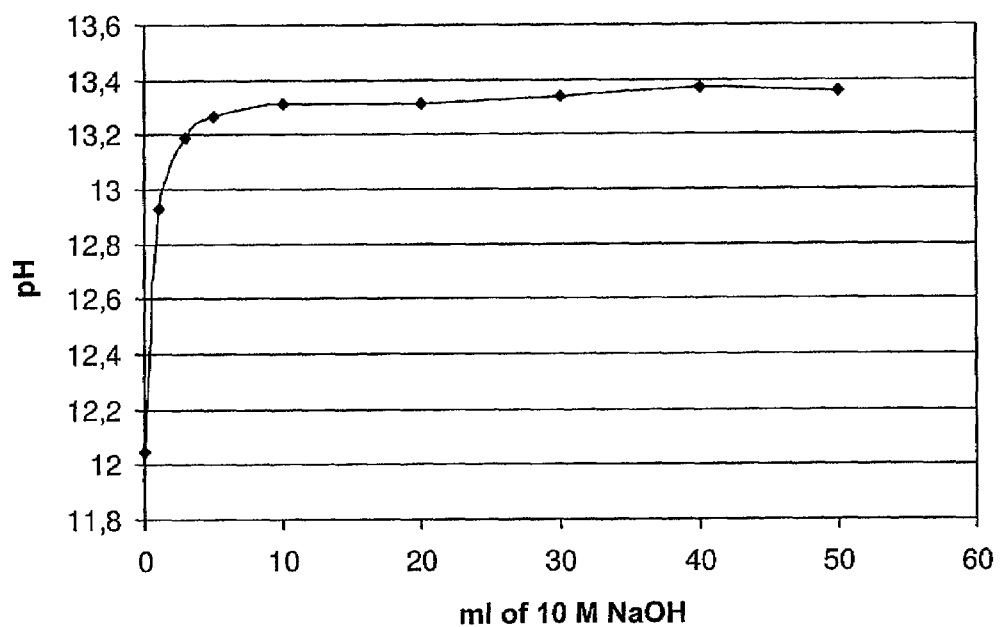
FIG. 2 shows a titration graph of bottom ashes titrated with a 10 M NaOH solution.
Figure 3:
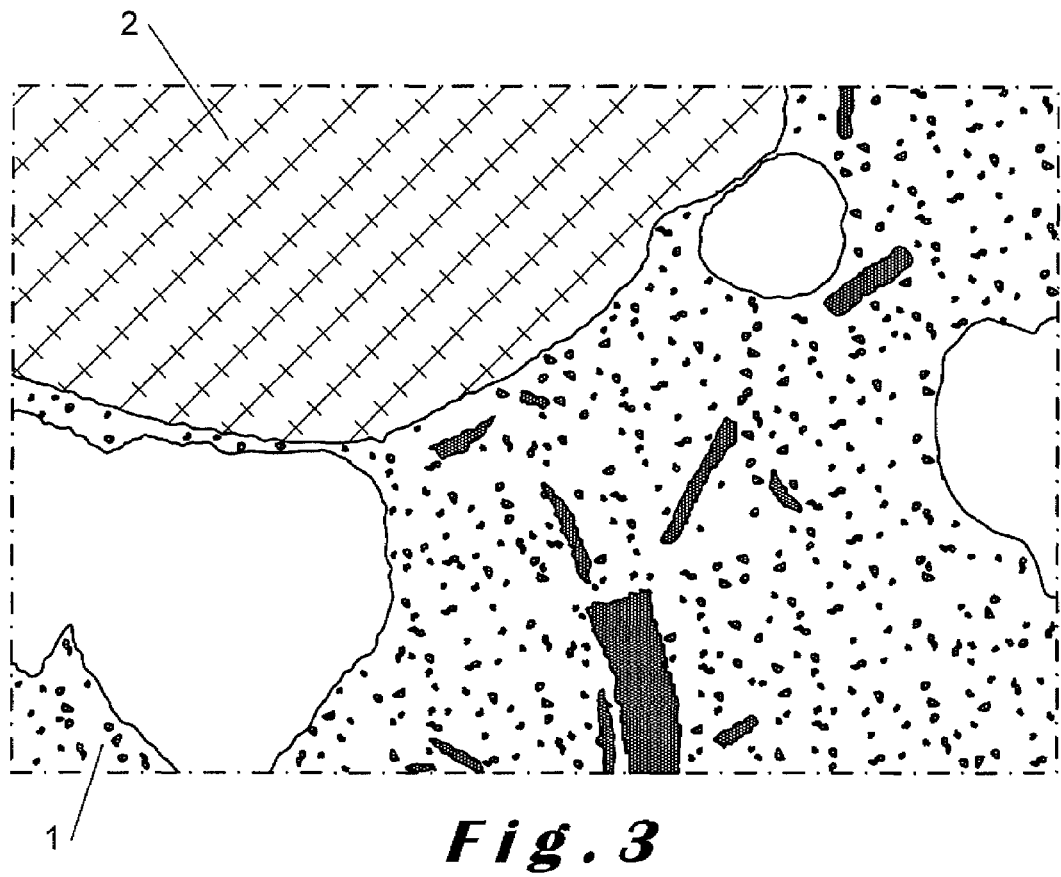
FIG. 3 shows an enlarged schematic view of municipal waste incinerator bottom ash.

Municipal waste incinerator bottom ash (MWI-bottom ash), as illustrated in FIG. 3, consists essentially of mineral material and is like a greyish gravel in which residues such as bottle glass, ceramics, scrap iron and non-ferrous metals can be identified.

This is a fairly heterogeneous material since microscopic observation reveals the presence of two distinct zones illustrated in FIG. 3:

- a so-called "slaggy" zone 1, with low density because of its vacuolar structure and which comprises melting residues such as non-molten bottle glasses, metal debris, etc, and
- a glassy zone 2 which may either be in the completely amorphous state or contain mineral phases formed at high temperature (typically calcium silicates), the dendritic structure of which testifies to rapid cooling during a quenching step.

The composition of the bottom ash therefore proves to be extremely complex and, among the main constituents, there are generally:

- a glassy matrix resulting from the quenching of a liquid silicate;

minerals formed at high temperature that consist generally of silicates and oxides;

species neoformed at low temperature at the discharge from the furnace, including mainly portlandite [$Ca(OH)_2$] issuing from the hydration of the lime that occurs during the quenching undergone by the bottom ash, carbonates and, to a lesser extent, chlorides;

calcium sulphates, which may be present in residual form or be formed either at high temperature, by oxidation of the $SO_2$ issuing from the combustion and reaction thereof with the calcium mobilised in the furnace, or at low temperature by precipitation during the quenching by capture of the $SO_2$ by the water in combination with the available calcium;

metals (Al, Cu, Fe) and alloys (Pb—Al) coming from residual fragments issuing from the incinerated waste;

relic phases that are mainly constituent minerals such as quartz, potassium, feldspars and glass debris that has not melted;

unburnt materials that correspond to combustible organic material that has not resided for long enough in the furnace or that was protected by other compounds by an encapsulation effect.

In the prior art, generally a natural aging of the bottom ash is carried out for several months before using it as a construction material. This aging step is highly complex since it comprises several phenomena: slow oxidation of the unburnt materials, carbonation of the lime that leads to a reduction in pH responsible for the destabilisation of ettringite [$Ca_6Al_2(SO_4)_3(OH)_{12}.26H_2O$], oxidation/hydroxylation of the aluminium and oxidation/hydroxylation of the iron. One drawback of this natural aging is that it takes a great deal of time and space. The purpose of this aging processing of the MWI-bottom ash is intended firstly to stabilise it in particular on a dimensional level and secondly to fix the heavy metals within the neoformed phases. This is because the carbonates, in precipitating, are liable to trap the trace elements such as cadmium, lead and zinc whereas the same elements with in addition copper and manganese appear to have great affinity for the iron and aluminium (hydr)oxides.

Figure 4:
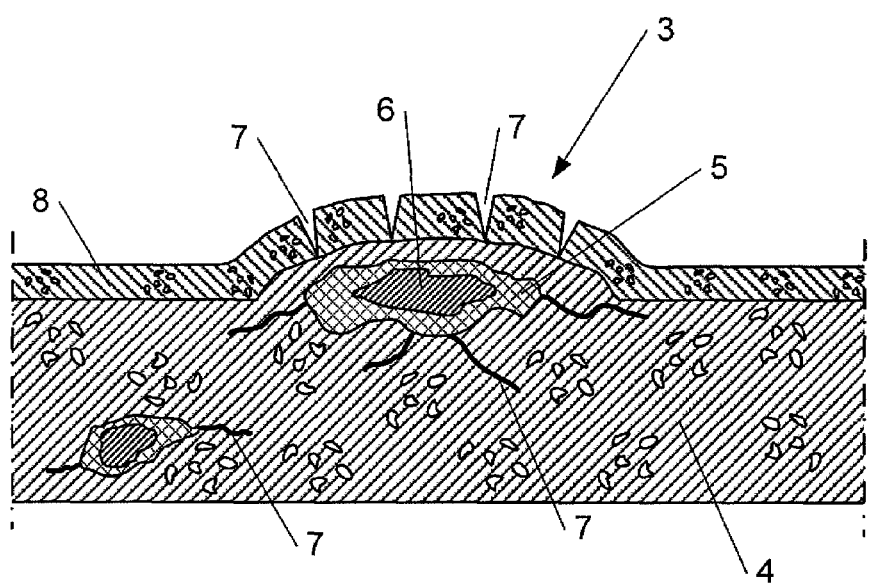
FIG. 4 shows a transverse section of a roadway with a base layer comprising bottom ash insufficiently matured before use thereof.

If the bottom ash is used without sufficient aging, swelling phenomena caused in particular by the subsequent formation of aluminium hydroxides from aluminium metal and ettringite still present in the bottom ash may take place. The deleterious effects of these phenomena on for example a road 3 having a base layer 4 comprising bottom ash are illustrated in FIG. 4. The aluminium hydroxides 5 precipitating around the aluminium metal particles 6 cause swelling and cracks 7 both in the base layer 4 and in the bituminous concrete topping 8.

Tests have shown that bottom ash directly subjected to a dynamic accelerated carbonation process in a rotary drum has a pH value (8.3-8.9) and a carbonate level (5-12%) fairly similar to those of products matured naturally for several months. In addition, as expected, DRX analysis demonstrates the absence of portlandite [$Ca(OH)_2$] and ettringite [$Ca_6Al_2(SO_4)_3(OH)_{12}.26H_2O$] and the formation of calcite [$CaCO_3$]. However, it turned out that the values of the melting loss in weight at 1000° C. of bottom ash that has undergone accelerated carbonation in a rotary drum were abnormally low if account was taken of the quantity of $CO_2$ that should have been eliminated during heat treatment, following the decomposition of the calcite formed by carbonation. This difference can be attributed to the fact that, in the case of accelerated carbonation, heat treatment leads to an oxidation of the residual aluminium metal and that the weight gain associated therewith partially counterbalances the weight loss related to the decomposition of the calcite. On the other hand, for bottom ash naturally aged for several weeks, the aluminium metal is either completely oxidised or hydroxylated so that no weight gain compensates for the weight loss relating to the release of $CO_2$. On the contrary, in this case, the weight loss should even be amplified as a result of the presence of $Al(OH)_3$ and the transformation thereof into $Al_2O_3$.

In bottom ash subjected solely to accelerated carbonation, it is therefore also possible to expect a substantial non-oxidated aluminium metal content, which may pose swelling problems. This was confirmed by swelling tests according to the CME-RW99-Methode 01.12.0 measurement method (the measurement method prescribed by the Walloon Region of Belgium), which demonstrated that, although some samples were below the threshold of the required maximum swelling of 2%, with only 1.4%, others slightly exceeded this limit value, with a swelling of 2.01% of the initial volume.

In one embodiment of the proposed treatment method, the bottom ash is first of all subjected to an initial step of separation of aluminium metal by eddy currents, in the same way as in the conventional treatment of bottom ash, in order to recover a large proportion of this aluminium. The thus obtained bottom ash still contains at least 0.1% by dry weight, in particular at least 0.3% by dry weight and more particularly at least 0.5% by dry weight of aluminium metal. Usually it contains between 0.8 and 2.5% by dry weight of aluminium metal.

Next, one or more oxidising agents such as sodium hypochlorite, hydrogen or calcium peroxides, potassium permanganate and/or sodium perborate are added to the municipal waste incinerator bottom ash before accelerated carbonation thereof in a rotary drum. The oxidising agents may be added in the form of an aqueous solution, serving at the same time to raise the moisture content of the bottom ash. Preferably a relatively small amount of aqueous solution is used so that the moisture content of the granular material is less than 90% by dry weight, preferably less than 70% by dry weight and more preferably less than 50% by dry weight during the accelerated oxidation. In that way, the moisture content of the granular material doesn't need to be lowered before the carbonation step in order to achieve a high carbonation rate. At the start of the carbonation step, the optimum moisture content is approximately 12% by weight of bottom ash but especially when performing the carbonation step in a rotary drum, higher moisture content have no major effect on the carbonation rate. This aqueous solution of oxidising agent may contain for example 1% by weight oxidising agent with respect to the dry bottom ash weight and is preferably sprayed onto the bottom ash. Due to the alkaline nature of the bottom ash, the moisture contained therein will usually be alkaline, even when the aqueous solution of the oxidising agent which is applied onto the bottom ash may be (somewhat) acidic.

The addition of oxidising agents before the accelerated carbonation restricts the swelling of the finished material:
 by enhancing oxidation of the metal aluminium grains;
 by promoting precipitation in the form of oxide and/or hydroxide of the aluminium released during the decomposition of the ettringite and moving the chemical balances in favour of this decomposition.

After a waiting time of 24 hours, in order to permit oxidation of the aluminium metal, the bottom ash is subjected to an accelerated dynamic carbonation in a rotary drum for 4 to 5 hours. Combustion gases, such as for example household waste incineration fumes, are introduced into the drum in order to obtain a hot atmosphere (approximately 50° C.) enriched with carbon dioxide (approximately 10% to 12%). However, a humidity level equal to or greater than 80% is maintained in the atmosphere of the drum rather than the usual 30% of household waste incineration fumes.

After this treatment, the bottom ash has a pH lower than 10, preferably lower than 9.5 and more preferably lower than 9. In the performed tests, the bottom ash had a pH of 8.2 (test performed with hydrogen peroxide) and 8.9 (test performed with sodium hypochlorite), which pH is similar both to that of bottom ash naturally matured for several months, and to that of bottom ash subjected to accelerated carbonation without prior oxidation. The carbonation does not therefore appear to be substantially affected by the oxidising agent. On the other hand, in the swelling test, the bottom ash treated in this way has a dimensional stability substantially superior to that of bottom ash treated solely by accelerated carbonation, and thus makes it possible to comply with the strict standards for construction, such as for example those for the use of bottom ash in foundation layers, subgrades (lean concrete) and fill in road construction.

The pH of the granular material is measured in accordance with the standard DIN 38414-S4

Instead of adding the oxidising agents before the accelerated carbonation, it is also possible to add them after this carbonation. This may be advantageous since passivation of aluminium metal is assisted at lower pH values. The pH of the moisture which is in contact with the aluminium metal is therefore preferably lowered before the oxidation step to a pH value lower than 9. This is preferably done by performing the carbonation step at least partially before and/of during the oxidation step. Naturally, the oxidising agents may also be partially added before and after the accelerated carbonation, thus combining the advantages of more effective oxidation under more alkaline conditions and more effective passivation under less alkaline conditions.

During the accelerated oxidation, the moisture content of the granular material is preferably less than 90% by dry weight, more preferably less than 70% by dry weight and most preferably less than 50% by dry weight. In this way, the oxidising agent is more concentrated thus increasing the oxidation rate. Moreover, the material needs less or even no drying after the oxidation step, in particular when performing the carbonation step after the oxidation step.

Although the present invention has been described with reference to specific example embodiments, it is obvious that various modifications and changes can be made to these examples without departing from the general scope of the invention as defined by the claims. For example, other carbonatable materials than bottom ash could be treated in this way, such as for example slag from aluminium production, or residues from the extraction and/or processing of metals, alone or mixed with a carbonatable binder, such as cement. In addition, although the granulometry of the resulting material may normally be simply adjusted by screening of the treated material, in particular in such a way that the carbonatable material contains particles with a size greater than 1 mm, preferable greater than 2 mm, and even more preferably greater than 4 mm, it is also possible to obtain, from a starting material with an excessively fine granulometry, a material with such a granulometry by adding to the treatment process a pelletisation step before or during the carbonation, so that the calcic matrix formed during the carbonation functions as a binder of fine particles in grains with larger dimensions. Consequently the description and drawings must be considered in an illustrative rather than restrictive sense.

The invention claimed is:

1. Method of treating an alkaline granular carbonatable material which contains aluminium metal and which has a pH of at least 10, which method comprises an oxidation step wherein at least a portion of said aluminium metal is oxidised by contact with moisture, characterised in that said oxidation is accelerated by providing at least one oxidising agent in said moisture, which oxidising agent has a higher redox potential than the water contained in said moisture, and in that the method comprises a carbonation step wherein the granular carbonatable material is at least partially carbonated.

2. Treatment method according to claim 1, wherein the alkaline granular carbonatable material is carbonated until it has a pH lower than 10.

3. Treatment method according to claim 1, wherein said carbonation is performed with carbon dioxide.

4. Treatment method according to claim 3, wherein said carbonation is accelerated by treating the alkaline granular carbonatable material with a medium containing more than 1 wt. % of carbon dioxide.

5. Treatment method according to claim 1, wherein said oxidising agent is selected from the group consisting of hypochlorites, peroxides, permanganates, perchlorates perborates and mixtures thereof.

6. Treatment method according to claim 1, wherein said oxidising agent is dissolved in an aqueous medium which is applied onto the alkaline granular material.

7. Treatment method according to claim 1, wherein said accelerated oxidation is at least partially performed after having lowered the pH of said moisture to a pH lower than 9.

8. Treatment method according to claim 7, wherein the pH of said moisture is lowered to a pH lower than 9 by performing the carbonation step at least partially before and/or during the oxidation step.

9. Treatment method according to claim 1, wherein the accelerated oxidation is performed at least partially before the carbonation.

10. Treatment method according to claim 1, wherein the moisture content of the granular material is less than 90% by dry weight during the accelerated oxidation.

11. Treatment method according to claim 1, wherein said carbonation is performed in a rotary drum.

12. Treatment method according to claim 1, wherein said granular carbonatable material contains at least bottom ash.

13. Treatment method according to claim 1, comprising a prior step of removing part of the aluminium metal by eddy currents.

14. Treatment method according to claim 1, wherein the granular carbonatable material comprises at the start of said oxidation step at least 0.1% by dry weight of aluminium metal.

15. Treatment method according to claim 1, wherein said carbonatable material is in the granular state during said carbonation step and during said oxidation step, and comprises during these steps particles with a size greater than 1 mm.

16. Treatment method according to claim 15, wherein said carbonatable material contains particles with a size greater than 2 mm during the carbonation and oxidation steps.

17. Treatment method according to claim 1, further comprising a pelletisation step during which the particles of said carbonatable material are agglomerated so as to obtain a coarser granular material, which pelletisation step is performed prior to and/or during the carbonation step.

18. Treatment method according to claim 1 comprising the further step of using the carbonated and oxidised granular material as a construction aggregate to produce a layer which is not bonded by means of cement.

19. Treatment method according to claim 12, wherein the alkaline granular material contains municipal waste incinerator bottom ash.

20. Treatment method according to claim 2, wherein the alkaline granular material is carbonated until it has a pH lower than 9.5.

21. Treatment method according to claim 20, wherein the alkaline granular material is carbonated until it has a pH lower than 9.

22. Treatment method according to claim 4, wherein said medium is a gas.

23. Treatment method according to claim 4, wherein said medium contains more than 5 wt. % of carbon dioxide.

24. Treatment method according to claim 23, wherein said medium contains more than 10 wt. % of carbon dioxide.

25. Treatment method according to claim 10, wherein the moisture content of the granular material is less than 70% by dry weight during the accelerated oxidation.

26. Treatment method according to claim 25, wherein the moisture content of the granular material is less than 50% by dry weight during the accelerated oxidation.

27. Treatment method according to claim 16, wherein said carbonatable material contains particles with a size greater than 4 mm during the carbonation and oxidation steps.

\* \* \* \* \*